Feb. 23, 1965  W. M. SCHOLL  3,170,250
FOOT CUSHIONING DEVICE
Original Filed June 22, 1962  2 Sheets-Sheet 1
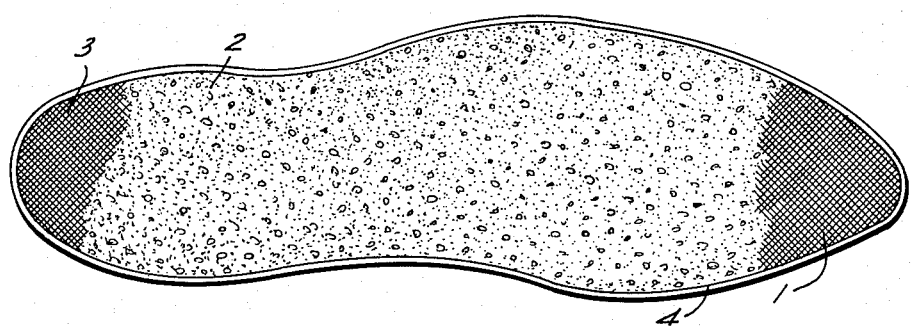
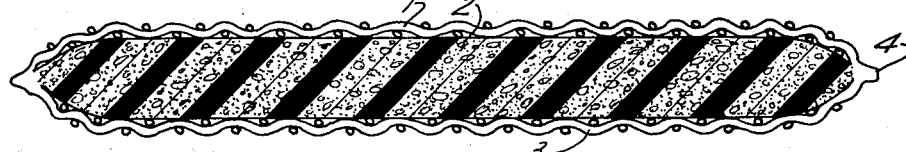
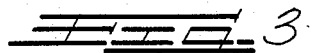
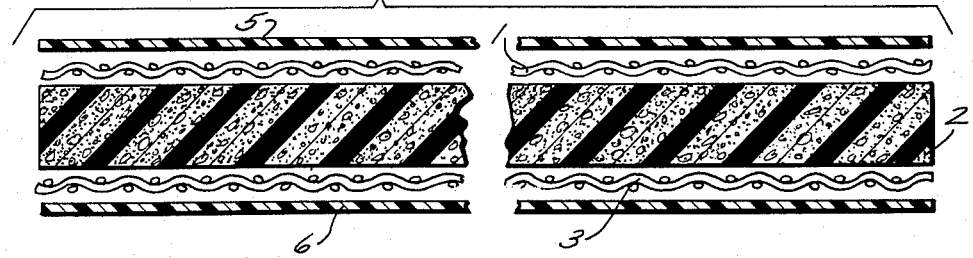
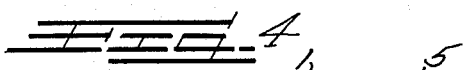
INVENTOR.
William M. Scholl
BY Hill, Sherman, Meroni, Gross & Simpson
ATTORNEYS

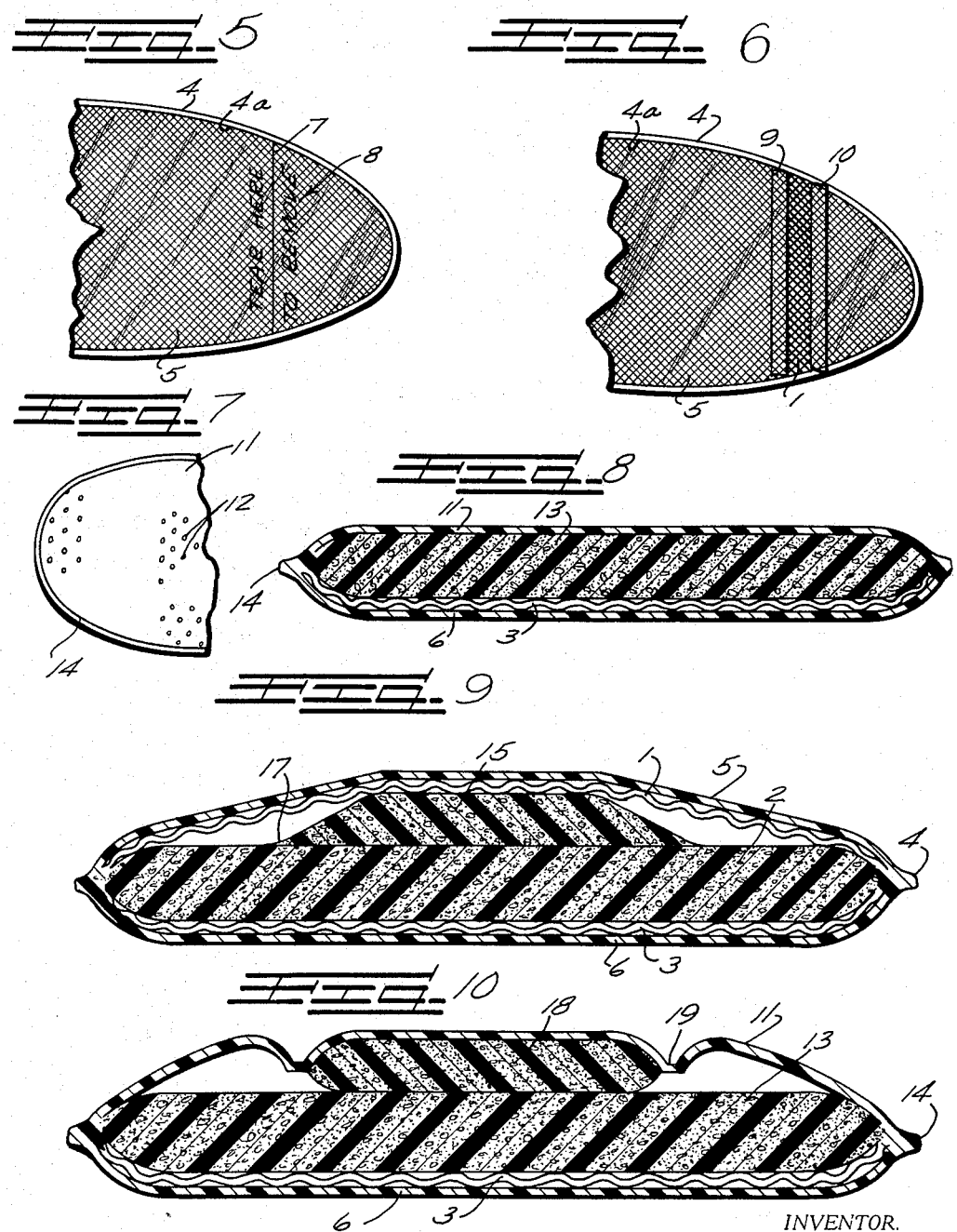

United States Patent Office 3,170,250
Patented Feb. 23, 1965

3,170,250
FOOT CUSHIONING DEVICE
William M. Scholl, 213 W. Schiller St., Chicago, Ill.
Original application June 22, 1962, Ser. No. 204,359. Divided and this application May 11, 1964, Ser. No. 366,430
10 Claims. (Cl. 36—44)

This invention relates to improvements in a foot cushioning device, and more particularly to a device of the insole type for free disposition in an article of footwear beneath the plantar surface of the human foot, although the device may be made in various other shapes and sizes and even for attachment directly to the foot, and while the device is preferably of a cushioning type, it may equally as well be of the heat insulating variety, or take other forms, all as will be apparent to one skilled in the art.

This application is a division of my copending application entitled "Method of Making a Foot Cushioning Insole," filed June 22, 1962, Serial No. 204,359, which copending parent application is in turn a continuation-in-part of an application entitled "Insole and Method of Making the Same," filed June 11, 1958, Serial No. 741,378, now abandoned. The copending parent application now contains claims directed to the method of making the instant invention.

It has become desirable in many instances to make foot cushioning and alleviating appliances and devices in the form of insoles, metatarsal lifts, arch lifts, and in various other forms, including various types of surgical pads, by utilizing layers of thermoplastic material heat sealed together. The heat sealing usually embodies the establishment of a seam defining the bounding edge of the device, although various types of lifts and inserts may be included at intermediate points anchored by being heat sealed to one or more of the layers or trapped in position as may be desired. In the making of devices of this character, there are times when it is desired to incorporate one or more layers of open-mesh fabric woven of thermoplastic strands of filaments, somewhat in the nature of a fly screen, but establishing a bounding edge fine line heat and tear seal seam in material of that kind with the use of a die in a high frequency electronic press, resulted in leaving exposed ends of the thermoplastic filaments at the bounding edge of the finished product rendering that edge somewhat saw-tooth in character, highly irritating to the user, especially if the exposed portion of a filament became bent out of its regular position. In any event, with the electronic die heat sealing process, it was virtually impossible to provide a fine smooth edge at the heat seal seam that would not irritate the foot of the user or injure the article of footwear, and at the same time provide a tear seal seam whereby the waste could be easily removed from the finished article.

In the past, insoles embodying a plurality of layers of open-mesh fabric woven from thermoplastic filaments heat sealed together around the bounding edge of the device have been made. However, where dies were used to unite such layers in the prior manufacture, in order to establish a heat seal seam it was necessary to employ two different press operations, thereby rendering the finished product prohibitively expensive for usual trade competition. Another method heretofore employed for uniting the edges of such open-mesh fabric layers required the precutting of blanks to substantially the desired size, stacking the blanks, holding them in a templet or the like, and then passing entirely around the bounding edge of the device with a heated tool to eliminate the raw edges and provide a heat seal seam. Precutting the pieces to size, then stacking them, putting on the holding means, and then the tedious operation with the heated tool results in a device also prohibitively expensive where competition is to be met. In other instances, a binding was placed around the raw edges of precut stacked blanks, and such is definitely not desired in a heat seal product.

With the foregoing in mind, it is an important object of the instant invention to provide a multi-layer foot appliance which may be formed in a single operation with an electronic die from stacked stock layers of indefinite size, and wherein at least the upper and lower layers are heat sealed together in a bounding seam, and with at least one of the layers of an open-mesh fabric woven of thermoplastic filaments, the device having a smooth and even as well as relatively fine heat seal seam.

Another object of the invention is the provision of a foot alleviating or cushioning device which may be formed in a single operation with an electronic die, which may embody several layers of material, some of which may be an open-mesh fabric woven of thermoplastic strands, but wherein the heat seal seam uniting the layers is externally smooth, requires no further or additional efforts to attain that smoothness, and is devoid of any unevenness, notwithstanding the number of layers of open-mesh fabric embodied in the device.

A further object of this invention is the provision of a foot alleviating or corrective device comprising a plurality of layers of thermoplastic material, the next outermost layer being an open-mesh fabric woven of thermoplastic strands, and the outer or cover layer being a thin thermoplastic film less tear resistant than the other layers, and with a heat seal seam uniting the layers, defining the bounding edge of the device, and also defining a tear line inside the seam for the thin cover film only, whereby that film may be selectively removed at any time by the user of the device.

Still another important object of the instant invention is the provision of a foot cushioning or alleviating device made up of a plurality of layers of air pervious thermoplastic material, with the outermost layer on at least one side of the device comprising a thin air impervious thermoplastic film less tear resistant than the inner layers, there being a heat seal seam joining all the layers and defining the bounding edge of the device, and the thin plastic film being removable whenever desired by tearing it from the appliance along the inside of the heat seal seam, whereby the user of the device may selectively render the device ventiletive in character if so desired.

It is another object of this invention to provide a foot cushioning device comprising a plurality of layers, of which the outer layer on each side of the device is a thin thermoplastic film, less tear resistant than the inner layers, all of the layers being joined by a heat seal seam defining the bounding edge of the device and a tear line for the removal of the thin cover layers inside the seam, and the cover layers bearing indicia thereon directing the manner of removal.

While some of the more salient features, characteristics and advantages of the instant invention have been above pointed out, others will become apparent from the following disclosures, taken in conjunction with the accompanying drawings, in which:

FIGURE 1 is a plan view of a foot cushioning device embodying improvements of the instant invention, with parts broken away to expose parts therebeneath, and with the original cover layer removed;

FIGURE 2 is a greatly enlarged transverse vertical sectional view of the structure of FIGURE 1;

FIGURE 3 is a greatly enlarged fragmentary vertical sectional and exploded view illustrating the various layers going to make up one form of device embodying principles of this invention;

FIGURE 4 is a greatly enlarged or magnified vertical sectional view through a device formed from the layers shown in FIGURE 3;

FIGURE 5 is a reduced fragmentary plan view of the structure of FIGURE 4;

FIGURE 6 is the same view as FIGURE 5 but illustrating the removal of one of the film cover layers;

FIGURE 7 is a fragmentary plan view of a slightly different form of foot cushioning device embodying principles of the instant invention;

FIGURE 8 is a greatly enlarged transverse vertical sectional view through the structure of FIGURE 7;

FIGURE 9 is a greatly enlarged transverse vertical sectional view through a foot alleviating or cushioning appliance of a still different form but embodying principles of this invention; and FIGURE 10 is a view similar in character to FIGURE 9, but illustrating another form of construction.

As shown on the drawings:

While, as stated above, the instant invention may be provided in various shapes, sizes, and thicknesses, for various specific purposes, by way of example and not by way of limitation, I have herein illustrated the device in the form of an insole.

In FIGURES 1 and 2 I have illustrated a foot cushioning device in the form of an insole as the same appears when the original cover layers have been removed so as to provide both cushioning and aeration or ventilation.

The device in this form comprises a top layer 1 which is in the form of an open-mesh fabric woven of thermoplastic filaments; an intermediate and much thicker layer 2 of cushioning material, preferably thermoplastic, and a bottom layer 3 of the same material as the top layer 1. All these layers are heat sealed together around the bounding edge of the device by a thin and externally smooth heat seal seam as indicated at 4.

The strands of the open-mesh layers 1 and 3 are thermoplastic that is capable of being commercially heat sealed by the electronic process. A number of materials are suitable for this purpose, and by way of example it may be stated that satisfactory results have been obtained by the use of a copolymer vinyl ester, vinylidene chloride, polystyrene, and others, certain of which are mentioned in U.S. Letters Patent Nos. 2,160,931 and 2,495,045. The cushioning layer 2 may satisfactorily be a chemical foam such as a synthetic resin foam of the class including vinyl chloride foams, polyester foams, isocyanate foams, polyurethane foams and others which are satisfactory.

Obviously, the open-mesh layers 1 and 3 permit the passage of air, and the same is true in connection with the foam layer 2 because that layer is cellular wth intercommunicating cells. Accordingly, when a device as shown in FIGURES 1 and 2 is worn it not only insulates the foot against heat or cold, but it also permits a circulation of air adjacent the plantar surface of the foot by successive compressions and expansions during walking, giving pleasant and confortable ventilation.

Such a cushioning device as previously described may be had in any desirable colors, may be laundered at will, is extremely quick drying, and is completely resistant to fungus, foot acids, perspiration and the like. It requires no special attention whatever and is extremely long lived.

In the manufacture of the devices, stock sheets of indefinite size are utilized so that many appliances or devices may be formed and severed from the respective sheets during the heat sealing process without the necessity of restacking any sheets and without the necessity of precutting individual blanks and the exercise of exceptional and tedious care in order to stack and handle individually cut blanks. In assembling the stock sheets in accord with the instant invention, the aforesaid sheets 1, 2 and 3 are disposed in stacked order between upper and lower cover sheets 5 and 6, as seen clearly in FIGURE 3. The sheets 5 and 6 are identical, and each is in the form of an extremely thin thermoplastic film, such as an unsupported vinyl film or sheet, which is less dense and less tear resistant than any of the sheets or layers 1, 2 and 3. The sheets 5 and 6 are also air impervious and when they are in use the device is not ventilative.

After the stock sheets are stacked as indicated in FIGURE 3, and it is of course understood that they will actually be lying one upon the other, a die preferably having the form or contour of the desired device is incorporated in an electronic heat sealing press and is brought down under pressure upon the superposed layers, whereupon a short charge of high frequency electric current is passed through the die, and the heat seal seam 4 is formed. At the same time the heat seal seam 4 is formed, a tear line is established immediately adjacent that seam permitting waste stock to be readily removed or stripped from the finished article around the outer edge of the seam. In the illustrated instance all of the layers are incorporated in that heat seal seam, but as will later appear herein the cushion layer need not be incorporated in the seam if layers above and below it are.

The thin films 5 and 6 during the making of the product provide additional thermoplastic material at the heat seal seam to fill up the interstices between the filaments and the fabric layers 1 and 3 so that an externally smooth edged heat seal seam is provided. However, these films 5 and 6 perform an important function in the finished product, namely that they give the ultimate user a choice as to whether he desires to keep them on the product or remove them. Due to less density of the material of the films 5 and 6, at the same time the heat seal seam is formed a tear line is established along the inner edge of this seam as indicated at 4a and 4b, respectively, in FIGURE 4. Accordingly, the film cover layers 5 and 6 may be removed whenever desired. If ventilative devices or appliances are initially requested the films may be removed by the manufacturer before delivery of the devices. However, if ventilative appliances are not demanded, the cover layers may remain in place and serve to maintain the article in a clean and sanitary condition as long as may be desired. It is preferable that each cover layer be provided with directions for its removal as shown in FIGURE 5 by printing or otherwise marking a tear line 7 across the respective film and putting a legend 8 adjacent the tear line telling how the cover layer may be removed. Should the user desire a ventilative appliance and wish to remove the films 5 and 6, this may readily be done by disrupting a film in the region of line 7, by tearing, cutting, or otherwise, and folding back the film as indicated by the flaps 9 and 10 in FIGURE 6 and stripping the entire film from the device along the inside of the heat seal seam 4.

It should be noted, however, that the customer or ultimate user is given a choice as to whether or not to use the cover films. If he does not wish his foot to contact directly the woven fabric layer, he may leave a cover film 5 or 6 in place. If he desies a non-ventilative appliance he may leave both cover films in place, if he desires to insulate his foot against wettness or dampness, he may leave one or both cover films in place, but if for any reason he desires to remove either or both cover films he can readily do so as explained above. With the cover films in place the device will appear as seen in FIGURES 4 and 5. With the cover films removed the device will appear as seen in FIGURES 1 and 2. Whether or not either or both films are removed, the heat seal seam 4 remains entirely smooth and even on its outer edge, is comfortable to the foot, will not injure articles of footwear, and is smooth and even over its entire extent, wherefore it is also extremely durable.

In FIGURES 7 and 8 I have illustrated a different form of the instant invention, wherein a foot cushioning appliance is shown as embodying a top layer 11 of thermoplastic material but which is in the form of a thin thermoplastic sheet, thicker and denser than the cover films 5 and 6 above described and which remains as a permanent part of the finished appliance. This top layer 11 may be an unsupported vinyl sheet, and may be provided with numerous perforations 12 therein as seen in FIGURE 7 if ventilation is desired. This form of the invention also includes a thick cushioning layer 13 which may be the same as the previously described layer 2. In this instance the upper fabric layer 1 and the upper cover film 5 are not utilized. However, the woven fabric layer 3 and the bottom cover film 6 are used in the same manner as previously described. The layers are joined by a bounding heat seal seam 14 which, as stated above, is smooth and even. The lower cover film 6 may be left intact upon the device, or removed whenever desired, as explained above.

In FIGURE 9 I have shown a form of the invention which embodies all of the layers above described in connection with FIGURES 3 and 4, but in addition a cushion lift 15 is disposed between the upper open-mesh fabric sheet 1 and the foam cushioning layer 2 at substantially any desirable location, the lift 15 being of less area than any of the other layers. The lift 15 may be a longitudinal arch support, a special heel seat, a metatarsal arch lift, or any other desired form of lift, and may be of any suitable material, the same as the cushion layer 2, or of denser material if so desired. If the lift is of denser material it will stay in position by virtue of being trapped by the other layers. If the lift is of a thermoplastic material, it may be anchored in position by being heat sealed to the cushion layer 2 only, as indictaed at 17 and it need not be secured to any of the other layers.

In FIGURE 10 I have shown an embodiment of the invention made up of the same layers of material described in connection with FIGURES 7 and 8, but in this instance a lift 18 of lesser size than the other layers is disposed between the denser cover layer 11 at any desirable location. Preferably the lift is of the same material as the cushion layer 13, but it may be of other material if desred. If it is of thermoplastic material it can be anchored to the cover in the desired location by a bounding heat seal seam as indicated at 19 and it need not be directly attached to any other layer.

If the layers going to make up the various embodiments of the instant invention herein set forth are not secured to each other, with the exception of the added lifts, except by the bounding heat seal seam an added advantage is provided in that wrinkling or creasing of the appliance during usage is effectively prevented, because each layer is permitted to individually restore itself to original condition and is not retracted by attachment or connection with another layer so that wrinkles or creases will not be set into the structure during use.

From the foregoing, it is apparent that I have provided a simple, economical, and highly durable form of foot cushioning or alleviating device which provides the ultimate user with a choice of having a ventilative device, a non-ventilative device, a choice of surfaces for foot contact, and a choice of having a device partially ventilative but one capable of insulating the foot against wetness or moisture.

It will be understood that modifications and variations may be effected without departing from the scope of the novel concepts of the present invention.

I claim as my invention:

1. In a cushioning device,
  a first layer of thermoplastic cushioning material,
  a second layer of open-mesh fabric woven of thermoplastic filaments overlying one side of the first layer,
  a thin thermoplastic film less dense than said layers over the exposed side of said fabric layer, and
  a fine line heat seal seam composed of the material of said layers and said film and defining the outline of the device, the inner edge of said seam forming a tear line for said film only.

2. In a cushioning layer,
  a first layer of thermoplastic cushioning material,
  a second layer of open-mesh fabric woven of thermoplastic filaments overlying one side of the first layer,
  a thin thermoplastic film more easily torn than said layers over the exposed side of one of said layers, and
  a fine line heat seal seam bonding said layers and said film and defining the outline of said device,
  said film being selectively removable inside said seam.

3. In an insole,
  a plurality of superposed layers of open-mesh fabric woven of thermoplastic filaments,
  a thin thermoplastic cover film less dense and more easily torn than said layers over the exposed face of and outermost layer, and
  a fine line heat seal seam composed of the material of said layers and film bonding said layers and film together,
  said film only being removable inside said seam.

4. In a cushioning device,
  a pair of thin thermoplastic cover films,
  a pair of layers of open-mesh fabric woven of thermoplastic filaments between said films,
  a layer of cushioning material between said fabric layers, and
  a heat seal seam joining said fabric layers and films and defining the bounding edge of the device and a tear line inside the seam for said films only, said films being less dense and more easily torn than said layers.

5. In a cushioning device,
  a layer of thermoplastic cushioning material,
  a sheet of open-mesh fabric woven of thermoplastic filaments overlying said layer,
  a thin thermoplastic film less tear resistant than said layer and said sheet overlying said sheet,
  a fine line heat seal seam having a smooth outer edge and composed of the material of said layer, sheet and film,
  said seam defining the outline of the device and a tear line inside the seam for said film only, and
  indicia on said film directing its removal.

6. In a cushioning device,
  a plurality of superposed layers of open-mesh fabric woven of thermoplastic strands,
  top and bottom thin thermoplastic cover films less tear resistant than said layers disposed with said layers therebetween, and
  a heat seal seam joining said fabric layers and said films and defining the bounding edge of the device and a tear line for each said film only inside said seam,
    whereby said films may selectively be removed.

7. In a cushioning device,
  a plurality of superposed layers of open-mesh fabric woven of thermoplastic strands,
  top and bottom thin thermoplastic cover films less tear resistant than said layers disposed with said layers therebetween,
  a heat seal seam joining said fabric layers and said films and defining the bounding edge of the device and a tear line for each said film only inside said seam,
    whereby said films may selectively be removed, and indicia on each of said films directing the removal thereof.

8. In an insole,
  a plurality of superposed layers of open-mesh fabric woven of thermoplastic filaments,
  a thin thermoplastic cover film less dense and more easily torn than said layers over the exposed face of an outermost layer, and
  a fine line heat seal seam composed of the material of said layers and film bonding said layers and film together and defining a tear line for said film only at the inside of said seam, whereby said film is selectively removable.

9. In a foot cushioning device, a plurality of superposed layers of air pervious thermoplastic material, a thin air impervious thermoplastic cover film less tear resistant than any of said layers and overlying the exposed face of an outermost layer, and a heat seal seam joining said layers and said film and defining the bounding edge of the device and a tear line at the inside of said seam for said film only, whereby said film may be selectively removed.

10. In a foot cushioning device, a layer of thermoplastic air pervious cushioning material, a thin air impervious thermoplastic film less tear resistant than said layer over each side of said layer, and a heat seal seam joining said layer and films and defining the bounding edge of the device and a tear line inside the seam for each of said films only, whereby said films may be selectively removed to render the device ventilative.

References Cited by the Examiner

UNITED STATES PATENTS

| | | | |
|---|---|---|---|
| 2,407,495 | 9/46 | High et al. | 156—538 X |
| 2,425,388 | 8/47 | Oestricher | 156—515 |
| 2,481,602 | 9/49 | Lindh | 156—290 |
| 2,495,045 | 1/50 | Woodbury et al. | 36—44 |
| 2,631,646 | 3/53 | Gannon et al. | 156—380 |
| 2,658,288 | 11/53 | Scholl. | |
| 2,804,419 | 8/57 | Woskin et al. | 156—267 |
| 2,878,153 | 3/59 | Hacklander | 156—163 |
| 2,979,835 | 4/61 | Scholl | 36—44 |
| 3,063,076 | 11/62 | Williams | 12—146 |
| 3,071,877 | 1/63 | Stickles | 36—44 |
| 3,080,589 | 3/63 | Midgley | 12—146 |

FOREIGN PATENTS 728,075  4/55  Great Britain.

JORDAN FRANKLIN, *Primary Examiner.*